United States Patent

[11] 3,622,397

[72] Inventor  Louis Belove
　　　　　　　Ardsley, N.Y.
[21] Appl. No.  750,796
[22] Filed  Aug. 7, 1968
[45] Patented  Nov. 23, 1971
[73] Assignee  Sonotone Corporation
　　　　　　　Elmsford, N.Y.
　　　　　　　Continuation-in-part of application Ser. No.
　　　　　　　712,525, Mar. 12, 1968, now abandoned.
　　　　　　　This application Aug. 7, 1968, Ser. No.
　　　　　　　750,796

[54] FAST RECHARGEABLE SEALED NICKEL-CADMIUM BATTERY CELLS COMBINED WITH EXCESS PRESSURE AND TEMPERATURE CONTROLS
19 Claims, 8 Drawing Figs.

[52] U.S. Cl. ................................................ 136/178,
　　　　　　　　　　　　　　　　　136/6, 136/181, 136/182
[51] Int. Cl. ........................................... H01m 1/06,
　　　　　　　　　　　　　　　　　　　　　　H01m 31/04
[50] Field of Search ......................................... 136/6, 177,
　　　　　　　　　　　　　　　　　　　　　　178, 181, 182

[56]　　　　　　References Cited
　　　　　　UNITED STATES PATENTS
2,289,128  7/1942  Kopf .......................... 136/182 X
3,081,366  3/1963  Belove ........................ 136/181 X
3,373,057  3/1968  Jost et al. .................... 136/6
3,470,025  9/1969  Yehiely ....................... 136/6

Primary Examiner—Donald L. Walton
Attorneys—J. Vincent Martin, Joe E. Edwards and Jack R. Springgate ABSTRACT: In a normally sealed battery cell of the type designed for fast recharging a protection arrangement is provided to safeguard against battery damage resulting from excess pressure or temperature. A pressure-responsive switch cuts off the charging current upon reaching of predetermined pressure level. A temperature-responsive switch may also be provided to limit the charging current upon the attainment of a specific high temperature. There is also disclosed a pressure-responsive vent to permit the release of excess pressure built up beyond a maximum danger level. The vent may be of the resealable type to reseal the battery after the release of the extremely high pressure built up. The vent being located on the same wall section as the pressure-responsive switching means. In another example, the pressure release vent is located at a casing portion other than the deflectable wall section.

INVENTOR.
LOUIS BELOVE

BY

OSTROLENK, FABER, GERB & SOFFEN

ATTORNEYS.

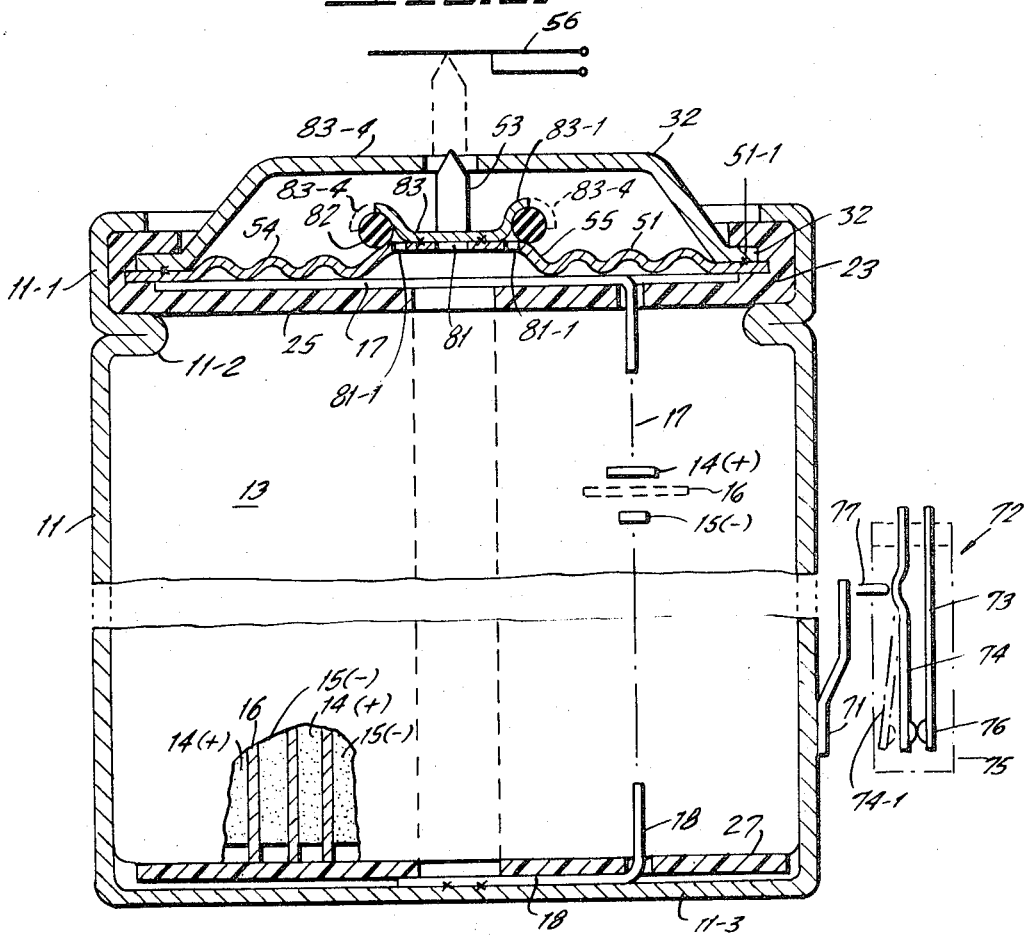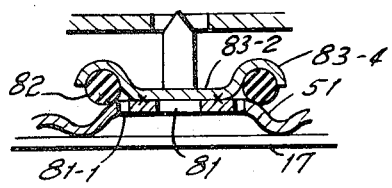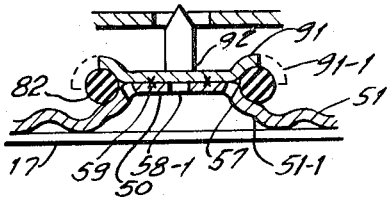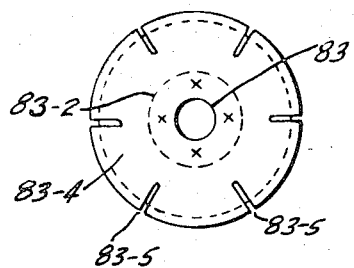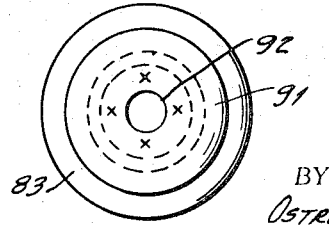

FAST RECHARGEABLE SEALED NICKEL-CADMIUM BATTERY CELLS COMBINED WITH EXCESS PRESSURE AND TEMPERATURE CONTROLS

The instant invention relates to a battery protection means for fast rechargeable sealed Ni-Cd cells of the type which can be rapidly recharged from a discharged state with a high charge current. Such cells are disclosed and claimed in copending application Ser. No. 712,525, now abandoned filed Mar. 12, 1968, by Louis Belove and Solomon Herzlich, of which the instant application is a continuation-in-part.

Such fast rechargeable sealed Ni-Cd cells are based on the discovery that with a negative electrode plate having at least 70 percent greater charge capacity than and fully covering the adjacent face of the positive electrode plate, and with the electrode plate assembly containing at most and not more than 90 percent of the electrolyte volume that could be absorbed in the electrode assembly, to give the negative electrode a much greater capacity to combine quickly along its faces with the vast amount of oxygen released by high charging current. This serves to prevent a dangerous rise of internal gas pressure under such high charging current even should overcharging persist for a prolonged period after the cell has been fully recharged. As a result, the user is enabled to fully recharge such sealed cells in a fraction of the time heretofore required. As an example, such new sealed cells of the size used, for example, in electric razors, can be fully recharged within 1 to 3 hours or in one-tenth to one-third of the time required with the prior art cells.

However, the high charging current required for recharging such new cells within less than 3 hours (e.g. 1 hour) may tend to cause excessive heating of the electrode assembly and to develop high internal gas pressure within the cells casing.

Among the objects of the present invention are such normally sealed nickel-cadmium battery cells—and also other types of normally sealed battery cells facing similar problems—which combine with the normally sealed cell casing one or more of the features outlined below for protecting against damage from excess pressure or temperature.

The normally sealed casing of such rechargeable battery cell is provided with a deflectable casing wall section which is deflected by rising internal gas pressure from a normal inward to an outward position for controlling the cell operation to limit the rising internal pressure to a certain pressure level. The casing wall section also has an elastically sealed vent passage. In accordance with one embodiment of the invention operating with a normally sealed tubular casing, one casing end wall constitutes the deflectable wall section which controls the operating battery circuit to limit internal pressure rise to an initial level. Such deflectable end wall may also embody the elastically sealed vent-passage closure which releases gases only upon internal pressure rise to a predetermined maximum allowable level. In a further embodiment of such sealed tubular cell, one end wall has such pressure limiting deflectable wall section, and the opposite end wall thereof has a normally sealed maximum pressure vent wall which releases gas upon internal pressure rising to such maximum. In still another embodiment such vent wall has a normally sealed vent passage which releases gases only upon internal pressure rising to such maximum allowable level, and thereafter the vent passage is resealed at a lower pressure.

Such normally sealed rechargeable cell casing may also have a deflectable wall section which controls the operating circuit of the battery cell to prevent excessive rise of internal pressure with circuit control means which control the operating circuit to limit the operating or charging current in response to the temperature of a cell's exceeding a certain maximum level. Such deflectable casing wall may also control the fast-charging circuit to cut off and/or reduce the fast charge to a leakage charge upon excessive cell temperature rise. Also, such combination wherein the fast charging is subject to combined cell temperature and cell pressure controls for cutting off or reducing the fast charge to a leakage charge upon excessive cell temperature rise and/or an excessive cell pressure rise. FIG. 1 is a cross-sectional partially diagrammatic view of a rechargeable sealed Ni-Cd cell having excess temperature and excess pressure controls exemplifying one form of the invention;

FIG. 3 is a cross section view similar to FIG. 1 exemplifying a similar rechargeable cell wherein the deflectable casing wall has a normally sealed and resealable vent which releases casing gases only at more than a certain high maximum pressure and is then automatically resealed at a lower pressure.

Figure 1:
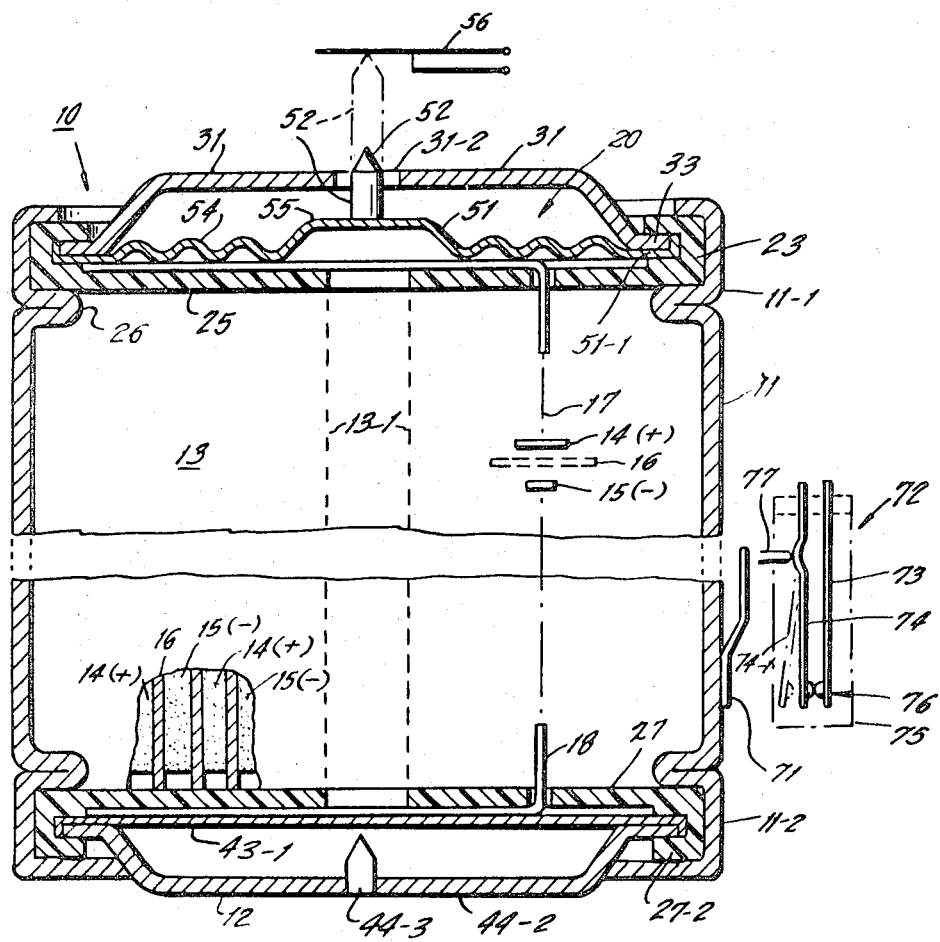
Figure 8:
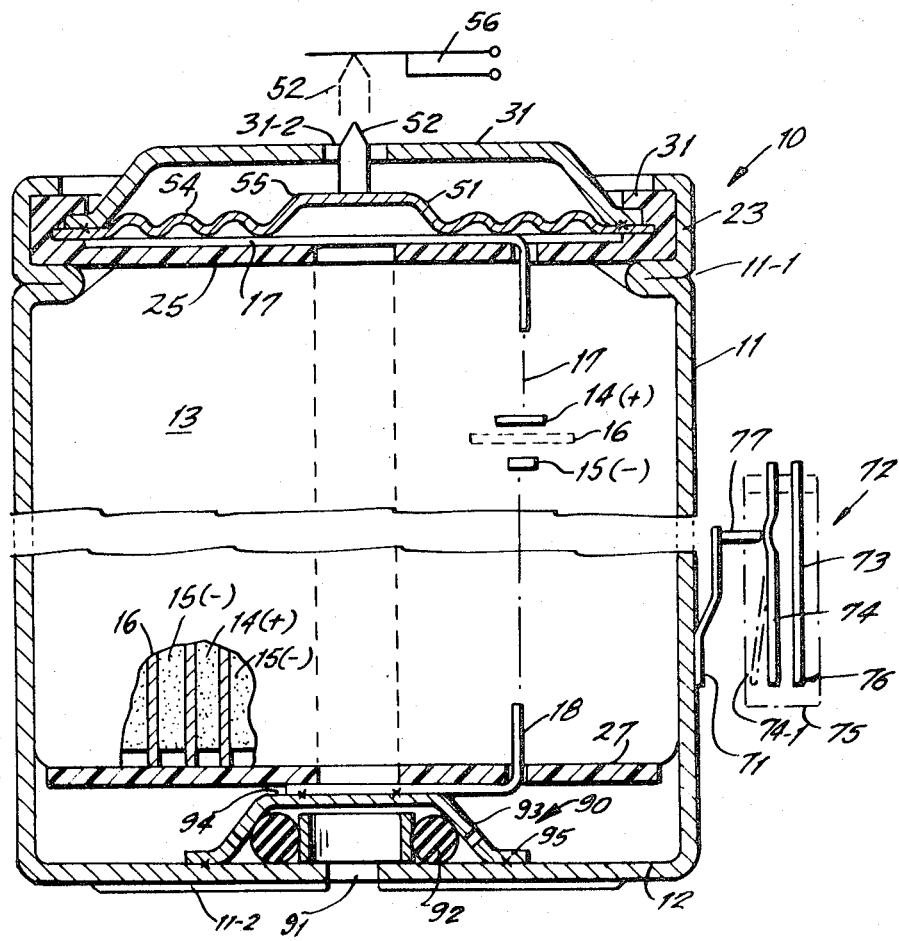

FIG. 4 is a cross section of the vent and deflectable casing portion, similar to FIG. 3, but with a modified resealable vent, FIG. 5 is a top view along line 5—5 of FIG. 4 of the central part of its deflectable casing-wall resealable vent region, FIGS. 6 and 7 are views similar to FIGS. 4 and 5 respectively, showing another example of the deflectable casing wall resealable casing vent, and FIG. 8 is a view similar to FIG. 1 of another example of such sealed cell wherein a casing wall other than the deflectable casing wall has a normally sealed vent passage which releases gases only upon their pressure exceeding a certain maximum.

FIG. 1 shows one form of sealed rechargeable battery cell 10 of the nickel cadmium type exemplifying the invention. It has a sealed metallic casing enclosure comprising a tubular metallic casing 11 having a closed bottom wall 12 and an upper casing end 20. The upper casing end 20 is enclosed and sealed by a metallic cover wall 31. The peripheral edge 33 of metallic cover wall 31 is joined by a leak tight insulating seal or joint 23 to the surrounding casing junction portion 11–1. The electrical insulating sealing joint 23 is formed by a collar 23 of an insulating material such as nylon or polypropylene which is tightly clamped to the cover edge 33 and folded over both sides of the adjoining cover rim and held tightly clamped thereto by the surrounding casing junction portion 11–1 against the casing shoulder 26. The insulating collar 23 is shown as an integral part of an insulating separator sheet 25 separating the metal cover 31 from underlying surface of the electrode assembly 13.

The electrode assembly 13 is of tubular shape and fills substantially all the interior space of the sealed tubular casing 11. The electrode assembly 13 comprises the diagrammatically indicated two electrolyte holding superposed opposite-polarity electrodes plates 14(+) and 15(−) separated by an electrolyte holding porous separator 16 of insulating material. The two electrode plates 14 and 15 form with their separator 16 a spirally coiled electrode assembly 13, a portion of which is seen in cross section in FIG. 1.

The negative electrode plate 15(−) covers or overlaps the entire surface of the adjacent positive electrode plate 14(+) and is coiled along its exterior convex surface. Similar sealed cells may be made with two or more pairs of such overlapping positive and negative electrode plates 14(+) and 15(−).

The electrode assembly 13 is usually wrapped in a film of insulating material which insulates it from the surrounding metallic casing 11. To the positive and negative cell electrode plates 14 and 15 are connected, as by electric weld joints, flexible metallic connector tabs 17 and 18, of nickel for instance. The remote ends of the metallic electrode tabs are connected as by electric welds to casing cover 31 and bottom casing wall 12 respectively, which constitute the exposed opposite polarity metallic cell terminals. An insulating sheet 27 insulates the bottom surface of electrode assembly 13 from bottom casing wall 12. Connector tab 17 extends through a slit or recess in upper insulating sheet 25. The opposite polarity electric connector tab 18 extends through a recess in the bottom insulator sheet 27. The coiled electrode assembly 13 is provided with a coaxial passage 13—1 of sufficient width for passing therethrough an elongated welding electrode for welding the bottom electrode tab 18 to the casing bottom 12.

The two electrodes 14 and 15 may be of any known type used in nickel-cadmium batteries, such as described in aforementioned U.S. application Ser. No. 712,525.

In FIG. 1, the specific electrode assembly 13 consists of two superposed thin sintered metal powder plates 14 and 15 and interposed thin separator 16 which have been tightly wound around a common axis and are held tightly fitting within the surrounding tubular metallic casing 11. Prior to the invention of aforementioned copending application Ser. No. 712,525, sealed Ni-Cd cells have been made with negative electrodes having a capacity 10 to 40 percent greater than the positive electrodes. Such prior sealed Ni-Cd cells had to be recharged with low charging current to prevent development of dangerously excessive internal pressure not only when recharging but also when the cell is overcharged after having been fully recharged. As an example, prior sealed Ni-Cd cells, which are widely used in electric razors, have to be recharged with only about 120 ma. (milliampere) so that the cell is not damaged while charging and the subsequent overcharge when left overnight in the charging circuit.

In a sealed cell as constructed in accordance with copending application Ser. No. 712,525, the simple charging current used for recharging may be increased at least about threefold. The time for fully recharging such cells is thereby substantially reduced.

The battery cell of FIG. 1 also includes excess temperature and excess pressure rapid-charge cutoff controls. Underneath the top metal cover 31 there is provided a gastight metallic elastic spring diaphragm 51. Affixed to the center of this diaphragm, as by cement, there is a rigid control rod or button 52 which may consist of a solid plastic such as polypropylene. The rim 51-1 of the metallic spring diaphragm 51 overlaps the rim 33 of cover 31 and they are both sealingly joined by insulating collar 23 to the surrounding casing junction section 11-1 to provide the required gas and leaktight seal for the casing 11. The metallic cover wall 31 has an opening 31-2 through which the control actuating button 52 of the spring diaphragm 51 projects outwardly beyond cover wall 31. The spring diaphragm 51 has concentric corrugations 54 and a raised button-carrying intermediate section or platform 55, normally biased to an inward casing position such as shown. When the internal casing gas pressure exceeds a predetermined maximum, such as 170 p.s.i., the spring diaphragm undergoes sufficient outward deflection to actuate the excess pressure switch 56 which is connected in the charging circuit (shown in FIG. 2) for cutting off the high charging current and reducing it to a low leakage charge. The raised diaphragm platform 55 engages the overlying cover wall 31 and thereby limits the maximum outward diaphragm deflection following the opening of excess pressure switch 56.

The spring diaphragm 51 is formed of strong and stable elastic sheet metal and its thickness is determined by the diameter of the tubular casing 11. As an example, in case of the specific sealed cell for use in an electric razor, the casing 11 has a 1 -inch diameter, the spring diaphragm 51 a slightly smaller diameter, such as fifteen-sixteenths inch and a thickness between 0.035 and 0.050 inch . It may be made of a nickel-base alloy containing steel and other alloy content used in thin spring sheet material. For instance, it may be made of the spring alloy sold under the trademark NI-SPAN.

In accordance with the invention, there is also provided a thermally responsive switch 72 connected or affixed to the casing and responsive to the rise of the cell or casing temperature to a certain maximum level, such as 150° to 170° F. for cutting of the high current charging circuit or reducing it to a low leakage charge current.

A wall portion of cell casing 11 has affixed to it, as by welding, a thermally responsive metallic member 71. Thermal-responsive member 71 may be for example, of known bimetallic type which deforms at a rate corresponding to the rise of casing temperature for actuating associated switch means 72 to cutoff or reduce the high charging current to a leakage charge.

Switch 72 has a stationary arm 73 and a snap arm 74 held relatively insulated by support 75. The contact ends 76 of the two arms 73, 74 are normally closed and are opened through actuation of pin 77 by temperature effected rightward deflection of bimetal member 71 to the dotted condition 74-1 shown in FIG. 1.

Figure 2:
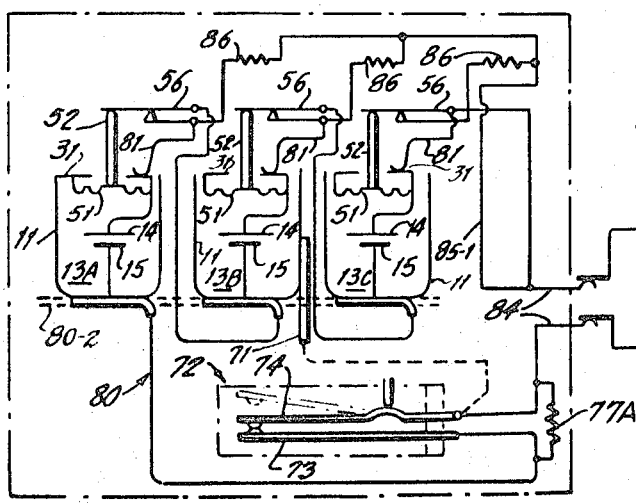
FIG. 2 is a diagrammatic view exemplifying a plurality of such fast rechargeable Ni-Cd sealed cells combined with a fast recharging circuit controlled by the excess temperature and excess pressure controls of such sealed cells.

The excess-pressure-responsive switch means 56 may be similar to the switch means 72 of the excess-temperature-responsive protection switch 72 of FIG. 2.

In accordance with the instant invention, a fast rechargeable Ni-Cd cell which is sealed at one tubular casing end by the charge-controlling excess-pressure-responsive spring diaphragm 51, has its opposite casing end sealed by a further thin sealing diaphragm which is punctured at certain excessive maximum internal pressure, for instance, 180 p.s.i., by deflection against an exterior cover-tooth to release the excess pressure gases.

The downward end of sealed tubular cell casing 11 is sealed by thin leaktight flexible sealing diaphragm 43-1, of metal for instance, which overlaps the more exterior rigid cover and wall 44-2. An insulating plastic sealing collar 27-2 is held clamped by the surrounding casing end section 11-2 against the rim edge of the sealing diaphragm 43-1 and the overlapped rim of end wall 44-2 to complete a leaktight seal between diaphragm 43-1 and casing section 11-2. At a certain maximum internal pressure, such as 180 p.s.i., sealing diaphragm 43-1 is outwardly deflected and punctured by endwall tooth 44-3, thereby releasing excess pressure gases through the wall opening of tooth 44-3. The thin puncturable metal diaphragm 43-1 sealing the bottom end of tubular cell casing 11 is similar to that used as excess pressure protection in the Ni-Cd cell of Belove U.S. Pat. No. 3,262,819.

The metallic puncturable venting diaphragm 43-1 and its exterior metal terminal wall 44-2 are shown insulated by sealing collar 27-2 from surrounding portion 11-2 of tubular metallic casing. However, a suitable metallic connection may be provided between them, as by making rim 11-2 extend and make a reliable metallic contact with end wall 44-2.

FIG. 2 is a circuit diagram showing an example of a recharger for fast recharging a plurality of sealed Ni-Cd cells of the invention. A plurality of sealed Ni-Cd cells, 13A, 13B, 13C, etc., are combined with common excess temperature charge-cutoff means 71-72 for cutting off or reducing the fast-charging current to leakage charging level in response to certain excessive temperature rise in any one of the nearby cells. In addition, the same excess-temperature-controlled fast-charging circuit also combines individual excess pressure charge-cutoff means 52-56 for each of the plurality of cells, operative to similarly cut off the fast-charging current in response to excess pressure rise in any one of the different cells.

It is assumed that a plurality of such sealed cells 13A to 13B, etc., are held nearby each other on a common support, such as indicated by dash lines 80-2. As a result, when fast recharging raises the temperature of one cell, for instance cell 13B, to a maximum, such as 160° F., the temperature of the nearby sealed cells 13A, 13B, and others will likewise be raised to similar high temperature, such as 160° F.

In FIG. 2, each of the sealed cells 13A, 13B, 13C is represented by tubular cell casing 11, the cell-sealing spring diaphragm 51, and the overlying cover 31 with the opening surrounding the diaphragm button 52 which operates the nearby pressure switch 56. A cell-charging circuit 80 includes serially the excess pressure switches 56, excess temperature switch 72 and leads which connect the different cells 13A to 13C in series aiding relation between cell-circuit terminals 84. The fast-charging current is delivered to the cell circuit 80 by a conventional rectified AC supply circuit including rectifier 87 and adjustment resistance 87-1 connected to cell input terminals 84. A capacitor 88 shunted by a resistance 88-1 is connected across cell input terminals 84 and is large enough to absorb charge surges when the high charging current is cutoff by the opening of either pressure control switch 56 or temperature control switch 72. Circuit leads, each including resistance 86 are connected in shunt between cover terminal 31 of each cell 13A, 13B, etc., and the circuit lead 85-1 of the proper cell input terminal 84 to reduce the high fast-charging current to a lower leakage charging current through cells 13A, 13B, etc., is opened by excess-pressure rise. If the fast-charging current causes the temperature of one of the nearby cells 13A, 13B, etc., to rise to the maximum level, such as 160° F., all these nearby cells will be raised to near the same maximum level. In such case, the sealed cell which is positioned between other so heated cells, such as cell 13B held between cells 13A and 13C, will usually have the highest temperature as it will be less cooled than the other more outward cells.

When rising temperature of cell 13B reaches certain maximum, the temperature-deformed bimetal switch member 71 activates its switch 72 to open the fast-charging circuit 80. A shunting resistance 77A is connected across the contacts of switch 72 to reduce the fast-charging current to a leakage charging current when switch 72 stops the fast-recharge.

In response to the pressure within any one of a plurality of such different cells, for example cell 13B, rising under the rapid charge to a certain maximum, such as 170 p.s.i., the control switch 56 of cell 13B will open, thereby reducing its high charging current to a leakage charge determined by its connection through resistance 86 to upper circuit terminal 84 of the charging circuit. If, thereafter, the pressure within cell 13B drops below such maximum its rapid charging circuit will be restored. The pressure control switches 56 of the other cells, such as 13A, 13C similarly protect the respective cell against fast charging when the respective cell pressure rises to such maximum.

FIG. 3 is cross-sectional view of an example of normally sealed rechargeable cell having a deflectable casing wall which cuts off or reduces the high charging current upon internal pressure rising to an initial high pressure, such as 165 p.s.i., and which opens a resealable vent passage in the deflectable wall section upon internal pressure rising above a maximum of 180 p.s.i., which opens a resealable vent passage in the deflectable wall section upon internal pressure rising above a maximum of 180 p.s.i. which vent passage is automatically reclosed upon internal pressure becoming lower than such maximum.

The normally sealed cell of FIG. 3, embodying this invention is otherwise identical with the cell of FIG. 1 except for features of the invention described below. The tubular cell casing 11 is shown formed with an integral metallic bottom wall 11-3. The similar electrode assembly 13 is enclosed in the sealed casing. The end of electrode lead 18 is connected to bottom wall 12 as by a conventional weld X. The end of the opposite electrode lead is similarly connected by welds X to the rim of deflectable diaphragm 51 and the casing cover rim 32 which is held in contact therewith.

The outwardly deflectable metallic spring diaphragm 51 has its rim 51 and the contacting rim 32 of exterior rigid cover and terminal wall 31 affixed with a leaktight insulating polymer seal 23 to the surrounding casing end.

The central or intermediate diaphragm portion 55 carries a button projection 53 for actuating control means, such as switch 56 which, for instance, is connected in the cell charging circuit (FIG. 2) to cut off or reduce the high charging current to a leakage current when internal casing pressure rises a certain initial high pressure, such as between 160–170 p.s.i.

The central or intermediate diaphragm portion or platform 55 is provided with a central vent opening 81 (and may but need not have additional peripheral openings 81-1) through which excess pressure gases may be released. To automatically seal such casing wall vent openings 81 there is provided an elastically stretched and large-mass elastomer loop or ring 82 of a large cross section which normally holds the vent passage or openings 81 sealed up to a certain maximum pressure, i.e., 180 p.s.i. However, upon internal pressure exceeding such maximum at least a portion of elastomer loop 82 opens its seal and releases excess pressure gases through such vent passage 81, but reestablishes the full leaktight seal upon internal pressure dropping below such maximum.

To maintain such elastomer loop 82 in its sealing condition, the intermediate diaphragm portion 55 is shown provided with a loop retainer member 83 having a rim 83-1 overlapping the underlying diaphragm portion 55 and forming or defining therewith the vent passage, the walls of which are engaged with the required sealing pressure by the tensioned elastomer loop 82. The loop retainer member 83 may be formed of strong sheet portion, which may consist of fiberglass reinforced polymer material, but is shown as sheet metal connected by welds X to underlying elements of central diaphragm portion 55. Such welds X leave between them gas passages for passing to the exterior gases leaving the casing interior through central diaphragm opening 81. In the example shown, the elastomer loop 82 is a circular ring shaped body and the cooperating vent parts 55, 83 have a complementary shape for maintaining a releasable vent seal.

With the sealed vent passage 81 of elements 55, 83, the elastomer loop 82 will be tensioned to maintain tight sealing engagement with the facing surface of vent passage wall elements 55, 83 up to a certain maximum internal pressure, i.e. 180 p.s.i., but will open at least in part its seal upon internal pressure rise above such maximum and release excess pressure gases which will pass through vent openings and the vent passage 81 between wall elements 55, 83-1. However, upon internal casing pressure dropping below such maximum, the tensioned elastomer will automatically reestablish its tight vent passage seal.

The vent passage seal described above in connection with FIG. 3 relies on the elastic stored energy of the tensioned elastomer loop 82 for normally securing the required tight vent passage seal and to release excess pressure gases only as long as the internal casing pressure exceeds a certain maximum.

FIGS. 4 and 5 show an example of a modified generally similar vent passage seal wherein the tensioned sealing loop 82 is subjected to a certain controlled additional sealing force. To a similar intermediate diaphragm portion 55 is similarly affixed a loop retained sheet 83-2 having wider rim 83-4 embracing and compressing a substantial part of the stretched elastomer loop against the underlying portion of diaphragm region 55. This retainer sheet 83-2 with its wider rim 83-4 are made of sheet material thickness and characteristic, and such shape as to cause the wider retainer rim to compress the embraced loop 82 with a certain selected force to assure that a portion of vent passage loop seal is opened only at a certain selected pressure and that the seal is automatically established at pressures higher than such seal-opening pressure. Although the retainer rim 83-4 may be continuous and embrace with its wall the entire facing surface of loop 82, it may be provided along its outermost rim region with generally radial slots as seen in FIG. 5 in order to cause such slotted rim to exert on the embraced loop 82 predetermined selected sealing compression forces.

FIGS. 6 and 7 show another way for combining the deflectable wall of such sealed cell casing with an automatically resealed vent passage which permits release of internal gases only at above certain maximum pressure, such as 180 p.s.i. The deflectable casing wall diaphragm 51 of an otherwise similar sealed cell has an intermediate diaphragm region 51-1 joined by a generally tubular junction region 57 to a central raised platform 58 which carries a switch actuating button 53 as in the cells of FIGS. 3, 4 and 5.

The most central or intermediate diaphragm platform 58 has a vent opening 58-1 (and may but need not have additional peripheral openings) through which excess pressure gases are released from casing 11. A similar stretched elastomer loop 82 is held with a certain sealing pressure against facing walls of a vent passage formed by diaphragm elements 51-1 and 57 and by embracing rim 91 of retainer sheet 92 (similar to sheet 83 of FIG. 3) which is shown affixed as by welds X to underlying sheet platform 58.

As in the preceding example, the stretched elastomer loop 82 has sufficiently large cross section and stores sufficient restoring energy as to cause it to engage and normally seal with a continuous loop surface the vent passage formed between the facing surfaces of embracing diaphragm element 57 to underlying retainer wall 92.

The elastomer loop 82, may consist of known alkali-resistant elastomers. As an example, ethylene-propylene elastomers have withstood without substantial deterioration prolonged exposure in a potassium hydroxide solution of 1.3 g./cm.$^3$ specific gravity. They are being supplied by Enjay Chemical Company and du Pont de Nemours & Co. Available fluoroelastomers have particularly high corrosion resistance to such alkali solution. They include the amorphous elastomer tripolymers of ethylene, propylene, and a small amount of nonconjugated diene, such as described in booklet "Ethylene Propylene Copolymer" by S. A. Bank, "Enjay ERP 404" and "ELD 60005" publications of Enjay Chemical Company. Similar fluoroelastomers are supplied by du Pont de Nemours & Co. under the name VITON.

FIG. 8 shows how a rechargeable cell may be provided with a resealable maximum pressure release vent on a casing wall portion other than the deflectable casing wall, for example, on the casing wall which is opposite its diaphragm casing wall 51. The FIG. 8 cell combines with its bottom casing wall 11-2 (or generally with a casing wall section other than that associated with diaphragm 51) a resealable vent passage which keeps the casing sealed up to certain maximum pressure, such as 180 p.s.i., but releases gases of excessive higher pressure and reseals the casing after the casing pressure falls below such maximum.

Vent opening is tightly sealed by a compressed closed elastomer loop which is wedged in under compression between the engage surface of the rigid bottom casing wall 11-2 and the inwardly converging retainer wall section 93 of a rigid retainer wall 94. Retainer wall 94 is made of rigid metal, steel for example, and has a rim affixed, as by a plurality of spaced welds X to casing wall 11-2. The end of electrode lead 18 is affixed by welds XX to the elastomer loop retainer element 94 which defines with the bottom casing wall the vent passage through which casing gases could be released through bottom wall opening 91.

Except for their separated welds XX, the retainer rim 95 and underlying wall portions of casing wall 11-2 provide between their facing surfaces a vent passage for releasing excess pressure gases from the casing interior which then pass through bottom wall opening 91 to the exterior, but only if the internal gas pressure lifts a portion (portions) of the elastomer loop 92 from its wedged sealing engagement with bottom wall 11-2 and overlying converging section 93 of retainer wall 94. The bottom casing wall 11-2 has radial bottom projections of slight height to provide spaces through which released gases may pass sidewise if casing wall 11-2 sits on a support. Further details of such a releasable sealed cell vent are disclosed in a copending patent application Ser. No. 157,060 filed on even date herewith, by R. J. Nathe.

Although there have been described specific examples of this novel invention, many variations and modifications will now be apparent to those skilled in the art. Therefore, this invention is to be limited, not by the specific disclosure herein, but only by the appending claims.

I claim:

1. A rechargeable battery cell comprising a normally sealed casing having at least two opposite polarity exposed relatively insulated metallic casing wall portions,
an electrolyte containing electrode assembly with at least two opposite polarity electrodes enclosed in said casing and tending to develop excessive internal pressure within the casing interior under certain operating conditions,
means for connecting said two electrodes to said two exposed casing wall portions, respectively,
said casing including a deflectable wall section,
bias means for urging said deflectable wall section to a normally inward position,
said deflectable wall section undergoing movement to an outward circuit control position upon internal casing pressure rising to a predetermined switching level,
said casing including a vent wall section having at least one vent passage to the casing interior for releasing excess pressure gases,
a polymer sealing body including elastic restraint elements carried on the exterior of said vent wall section with a tight seal against said vent passage
and preventing release of gases through said vent passage past said polymer body up to a certain predetermined maximum level in said casing,
at least a portion of said polymer body undergoing deformation and opening said seal with said vent passage and releasing gases past said polymer body upon said internal pressure rising to a value exceeding said maximum level,
said elastic restraint elements causing said polymer body to restore said seal with said vent passage and preventing release of gases upon said internal pressure becoming lower than said maximum level.

2. A rechargeable battery cell as set forth in claim 1, said vent wall section being part of the wall section including said deflectable wall section.

3. A rechargeable battery cell as set forth in claim 1, said pressure release wall section being located at a casing portion other than said deflectable wall section.

4. A rechargeable battery cell as set forth in claim 1, said predetermined maximum level of vent opening exceeding said predetermined switching level by a specified magnitude.

5. A rechargeable battery cell as claimed in claim 2, said deflectable wall section constituting a diaphragm having a rim,
endless insulating elements joining said rim with a leaktight seal to nearby portions of said casing,
said diaphragm having said vent passage to said casing interior,
and sealing body including an endless elastomer loop of substantial cross section carried by said diaphragm and held with a tight seal against said vent passage and normally preventing gas release from said casing,
at least portions of said loop undergoing said deformation and opening said seal at said maximum pressure,
and restoring said seal below said maximum pressure.

6. A rechargeable cell as claimed in claim 5, said diaphragm having an intermediate barrier section having said vent passage.

7. A rechargeable battery cell as claimed in claim 6, said diaphragm having an intermediate barrier section having said vent passage,
and retainer elements carried by said barrier section and defining therewith two opposite endless sealing surfaces of said vent passage,
said loop being held by said restraint elements with said tight seal against opposite endless seating surfaces.

8. A rechargeable battery cell as claimed in claim 7, said diaphragm having an intermediate barrier section having said vent passage,
and metallic retainer sheet elements carried by said barrier section and defining therewith two opposite endless sealing surfaces of said vent passage,
said loop being held by said restraint elements with said tight seal against opposite endless seating surfaces.

9. A rechargeable battery cell as claimed in claim 7, said diaphragm having an intermediate barrier section having said vent passage,
and retainer elements carried by said barrier section and defining therewith two opposite endless sealing surfaces of said vent passage,
said loop being held by said restraint elements with said tight seal against opposite endless seating surfaces,
said retainer element having rim portions embracing and at least partially compressing said loop against said sealing surfaces.

10. A rechargeable cell as claimed in claim 7, said diaphragm having an intermediate barrier section having said vent passage, and metallic retainer sheet elements carried by said barrier section and defining therewith two opposite endless sealing surfaces of said vent passage, said loop being held by said restraint elements with said tight seal against opposite endless seating surfaces, said retainer element having rim portions embracing and at least partially compressing said loop against said sealing surfaces.

11. In a rechargeable battery cell as claimed in claim 3, said deflectable wall section constituting a diaphragm having a rim, an endless insulating loop joining with a tight seal and diaphragm rim to a nearby wall portion of said casing, a casing portion remote from said diaphragm having said vent passage, and carrying said polymer body.

12. A rechargeable battery cell comprising a normally sealed casing having at least two opposite polarity exposed relatively insulated metallic casing wall portions, an electrolyte-containing electrode assembly with at least two opposite polarity electrodes enclosed in said casing and tending to develop excessive internal pressure within the casing interior under certain operating conditions, said two electrodes having connections to said two exposed casing wall portions, respectively, said electrode assembly holding at most 90 percent of the electrolyte volume required to substantially saturate the pores of said electrode assembly, said electrode assembly being formed of electrode plates, the negative plate having a face at least covering the face of the adjacent positive plate and a charge capacity at least 70 percent greater than that of said positive plate causing said positive plate to absorb the major gas volume part developed when the assembly is recharged within three hours from a fully discharged state, said casing having a deflectable wall section elastically biased to an inward position, and undergoing movement to an outward circuit-control position upon internal casing pressure rising to a certain raised initial pressure, and return movement to said inward position upon said internal pressure becoming lower than said initial pressure, said deflectable wall section being part of one of said wall portions, said wall section having at least one vent passage to the casing interior for releasing gases, a polymer sealing body including elastic restraint elements carried on the exterior of said wall section with a tight seal against said vent passage, and preventing release of gases through said vent passage past said polymer body up to a certain raised initial internal gas pressure in said casing, at least a portion of said polymer body undergoing deformation and opening said seal with said vent passage and releasing gases past said polymer body upon said internal pressure rising to a certain maximum exceeding said initial pressure, said elastic restraint elements causing said polymer body to restore said seal with said vent passage and preventing release of gases upon said internal pressure becoming lower than said maximum 13. A rechargeable cell as claimed in claim 12, said deflectable wall section constituting a diaphragm having a rim, endless insulating elements joining said rim with a leaktight seal to nearby portions of said casing, said diaphragm having said vent passage to said casing interior, and sealing body including an endless elastomer loop of substantial cross section carried by said diaphragm and held with a tight seal against said vent passage and normally preventing gas release from said casing, at least portions of said loop undergoing said deformation and opening said seal at said maximum pressure, and restoring said seal below said maximum pressure.

14. A rechargeable cell as claimed in claim 13, said diaphragm consisting essentially of metal and having a barrier section having said vent passage, and metallic retainer sheet elements carried by said barrier section and defining therewith two opposite endless sealing surfaces of said vent passage, said loop being held by said restraint elements with said tight seal against opposite endless sealing surfaces.

15. A rechargeable battery cell, comprising a normally sealed casing having at least two opposite polarity exposed relatively insulated metallic casing wall portions, an electrolyte-containing electrode assembly with at least two opposite polarity electrodes enclosed in said casing and tending to develop excessive internal pressure within the casing interior under certain operating conditions, said two electrodes having connections to said two exposed casing wall portions, respectively, said electrode assembly holding at most 90 percent of the electrolyte volume required to substantially saturate the pores of said electrode assembly, said electrode assembly being formed of electrode plates, and the negative plate having a face at least covering the face of the adjacent positive plate and a charge capacity at least 70 percent greater than that of said positive plate causing said positive plate to absorb the major gas volume part developed when the assembly is recharged within three hours from a fully discharged state, said casing having a deflectable wall section elastically biased to an inward position, and undergoing movement to an outward circuit-control position upon internal casing pressure rising to a certain raised initial pressure, and return movement to said inward position upon said internal pressure becoming lower than said initial pressure, a further casing portion other than said deflectable wall section having vent passage to the casing exterior for releasing excess pressure gases, a polymer sealing body including elastic restraint elements carried on the interior of said casing portion with a tight seal against said vent passage, and preventing release of gases through said vent passage past said polymer body up to a certain raised maximum internal gas pressure in said casing higher than said initial pressure, at least a portion of said polymer body undergoing deformation and opening said seal with said vent passage and releasing gases past said polymer body upon said internal pressure rising to said maximum initial pressure, said elastic restraint elements causing said polymer body to restore said seal with said vent passage and preventing release of gases upon said internal pressure becoming lower than said maximum.

16. A rechargeable cell comprising, a sealed container, electrodes within said container, electrolyte within said container, means for relieving pressure developing within said container, and means responsive to charging conditions within said container for providing a movement on the exterior of said cell whereby such movement may be used to discontinue fast charging and start a slow charge.

17. A rechargeable cell according to claim 16 wherein said means responsive to charging conditions is responsive to pressure which is developed within said container during charging.

18. A rechargeable cell according to claim 16 wherein said means responsive to charging conditions is responsive to temperature which is developed within said container during charging.

19. A rechargeable cell according to claim 16 wherein said means responsive to charging conditions includes a diaphragm extending across one end of said container exposed to conditions within said container on one side thereof and to external conditions on the other side thereof, means connecting to said diaphragm to provide for the actuation of a switch.

* * * * *